United States Patent
Bourolleau et al.

(10) Patent No.: US 11,702,961 B2
(45) Date of Patent: Jul. 18, 2023

(54) CASING MADE OF COMPOSITE MATERIAL WITH LOCAL VARIATION OF THICKNESS

(71) Applicant: SAFRAN AIRCRAFT ENGINES, Paris (FR)

(72) Inventors: Clément Bourolleau, Moissy-Cramayel (FR); Alexandre Branco, Moissy-Cramayel (FR); Serge Domingues, Moissy-Cramayel (FR); Vincent Pascal Fiore, Moissy-Cramayel (FR); Anwer Siraj, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 235 days.

(21) Appl. No.: 17/426,901

(22) PCT Filed: Jan. 17, 2020

(86) PCT No.: PCT/HR2020/050068
§ 371 (c)(1),
(2) Date: Jul. 29, 2021

(87) PCT Pub. No.: WO2020/157409
PCT Pub. Date: Aug. 6, 2020

(65) Prior Publication Data
US 2022/0120196 A1 Apr. 21, 2022

(30) Foreign Application Priority Data
Jan. 30, 2019 (FR) ..................................... 1900875

(51) Int. Cl.
*F01D 25/24* (2006.01)
*B29C 70/32* (2006.01)
(Continued)

(52) U.S. Cl.
CPC .............. *F01D 25/24* (2013.01); *B29C 70/24* (2013.01); *B29C 70/32* (2013.01); *F01D 21/045* (2013.01);
(Continued)

(58) Field of Classification Search
CPC ......... B28C 70/24; F01D 25/24; B29B 11/16; B29C 70/32
See application file for complete search history.

(56) References Cited

U.S. PATENT DOCUMENTS 8,322,971 B2 * 12/2012 Coupe ..................... B29C 70/32
139/384 R
2008/0206048 A1 8/2008 Coupe et al.
(Continued)

FOREIGN PATENT DOCUMENTS

CN 101249725 A 8/2008
CN 102232020 A 11/2011
(Continued)

OTHER PUBLICATIONS

International Search Report as issued in International Patent Application No. PCT/FR2020/050068, dated May 14, 2020.

*Primary Examiner* — Long T Tran
(74) *Attorney, Agent, or Firm* — Pillsbury Winthrop Shaw Pittman LLP

(57) ABSTRACT

A gas turbine fan casing made of composite material with a fibrous reinforcement includes a plurality of superimposed turns of a strip-shaped fibrous texture having a three-dimensional weaving between a plurality of layers of warp yarns and a plurality of layers of weft yarns, the fibrous reinforcement being densified by a matrix. The fibrous texture includes at least one lateral section of variable thickness in which the weft yarns have a size or a count different from the size or the count of the weft yarns of the plurality of layers of weft yarns present in the remainder of the fibrous texture.

11 Claims, 7 Drawing Sheets

(51) Int. Cl.
  *B29C 70/24* (2006.01)
  *F01D 21/04* (2006.01)
  *B29K 105/08* (2006.01)
  *B29L 31/00* (2006.01)

(52) U.S. Cl.
  CPC ............. *B29K 2105/0845* (2013.01); *B29L 2031/7504* (2013.01); *F05D 2240/14* (2013.01); *F05D 2300/6012* (2013.01); *F05D 2300/6031* (2013.01)

(56) References Cited

U.S. PATENT DOCUMENTS

| | | | |
|---|---|---|---|
| 2011/0311368 A1* | 12/2011 | Coupe | B29C 70/24 416/241 A |
| 2012/0055609 A1* | 3/2012 | Blanchard | C04B 35/62873 156/92 |
| 2013/0108422 A1* | 5/2013 | Coupe | F01D 9/02 416/223 R |
| 2013/0295302 A1* | 11/2013 | Godon | B32B 5/06 428/34.1 |
| 2014/0150262 A1* | 6/2014 | Le Borgne | B29C 70/088 29/889.3 |
| 2014/0369848 A1* | 12/2014 | Marchal | B29C 70/222 139/384 R |
| 2016/0376734 A1* | 12/2016 | Rousseau | D03C 9/02 139/11 |
| 2018/0045207 A1* | 2/2018 | Paquin | B29C 70/08 |
| 2018/0051705 A1* | 2/2018 | Foster | F04D 29/542 |

FOREIGN PATENT DOCUMENTS

| | | |
|---|---|---|
| FR | 3 045 456 A1 | 6/2017 |
| FR | 3 046 613 A1 | 7/2017 |
| WO | WO 2006/136755 A2 | 12/2006 |
| WO | WO 2018/041992 A1 | 3/2018 |

\* cited by examiner

[Fig. 1]
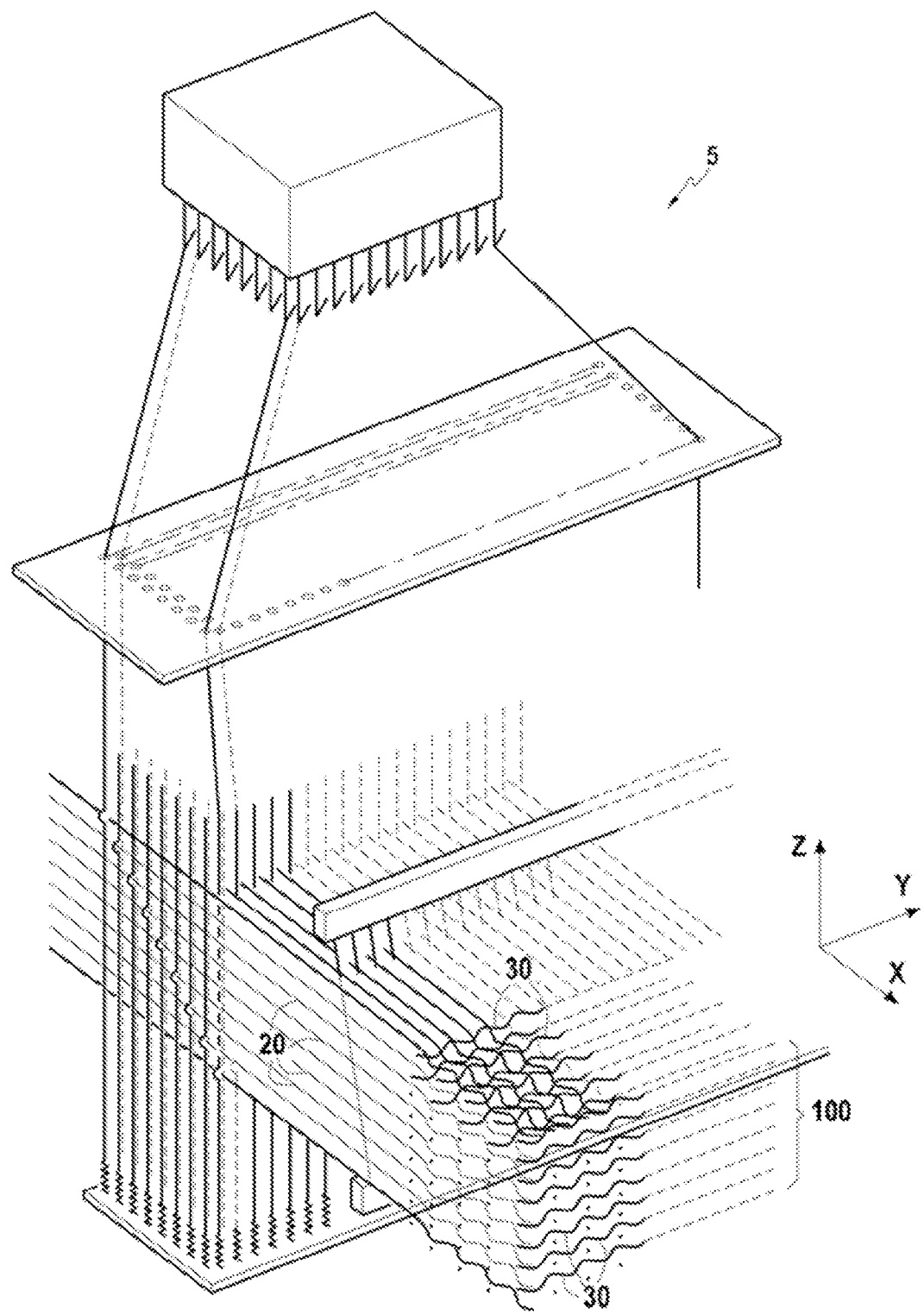

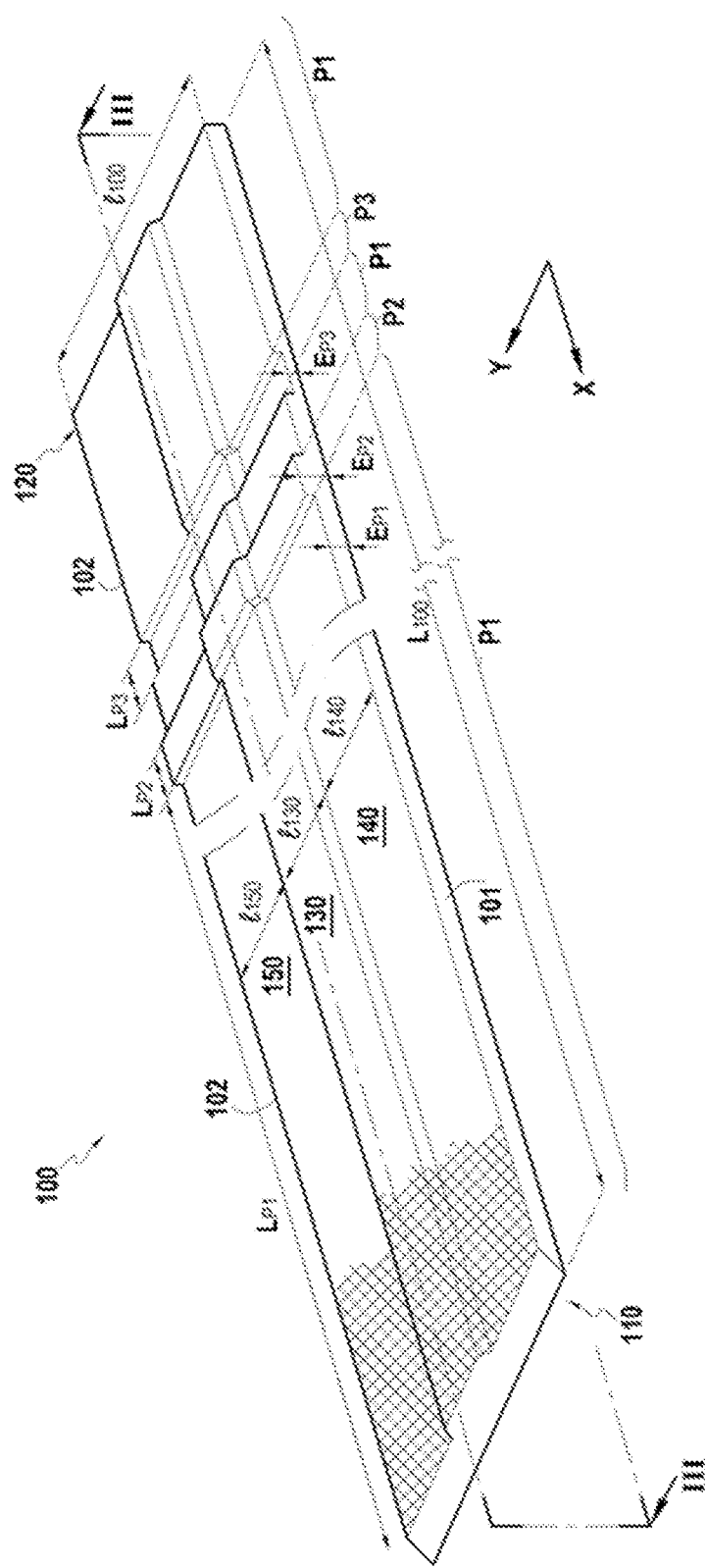
[Fig. 2]

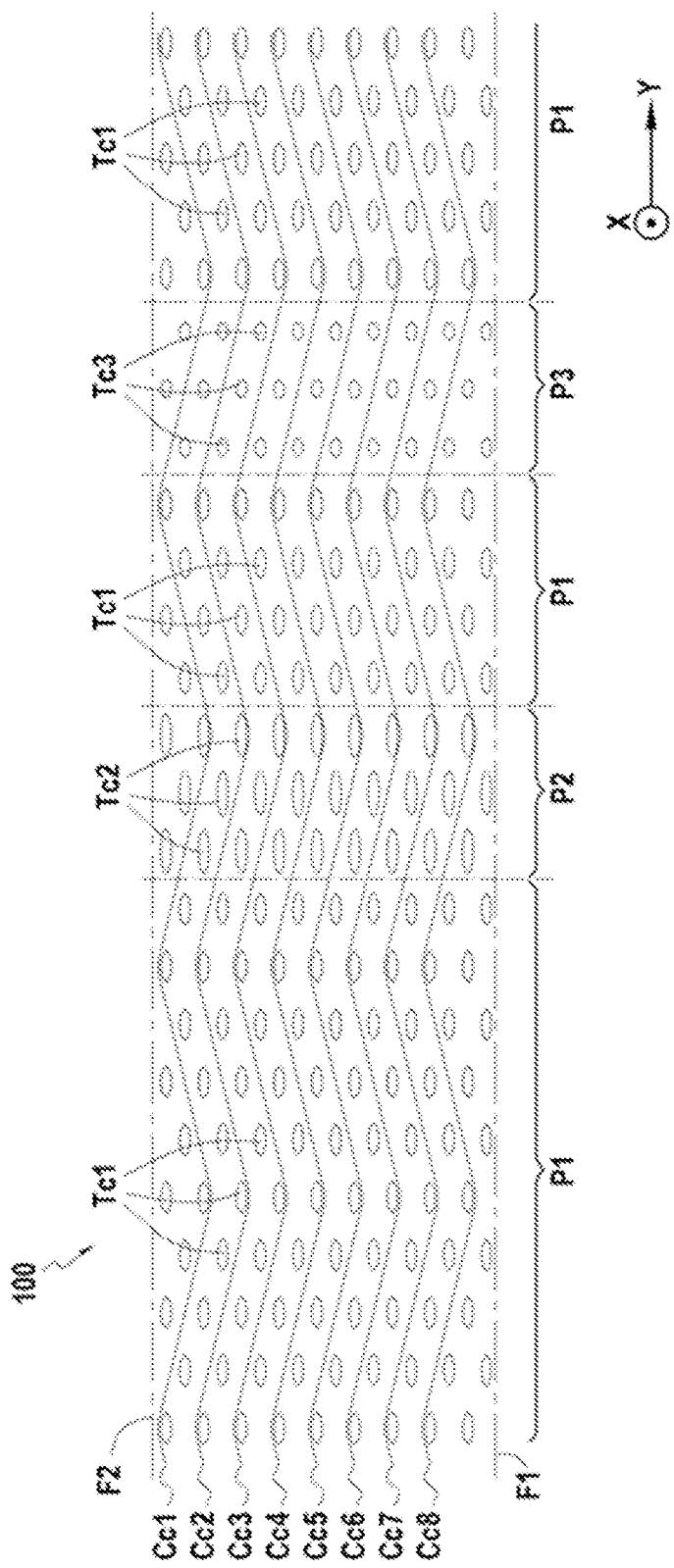

[Fig. 4]
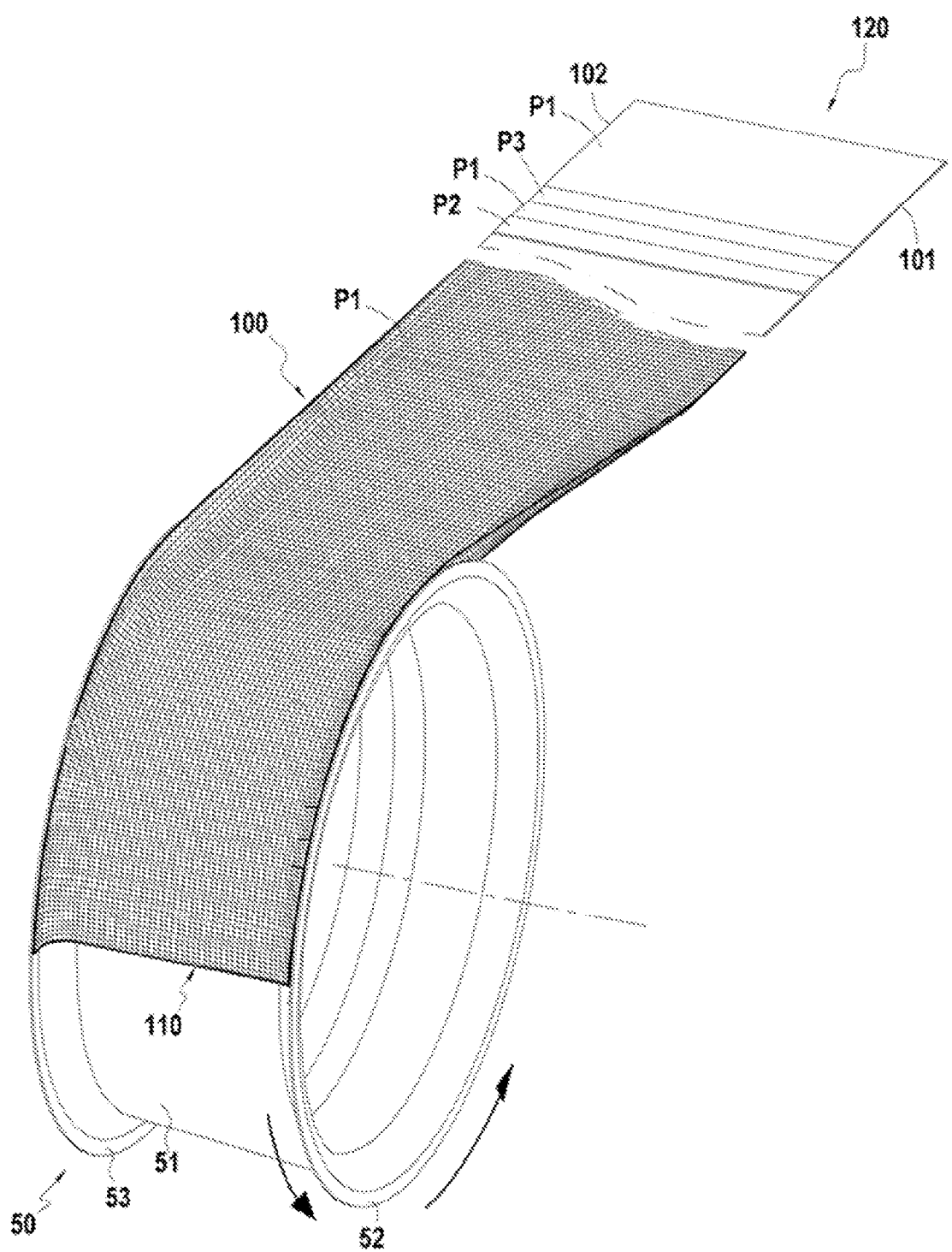

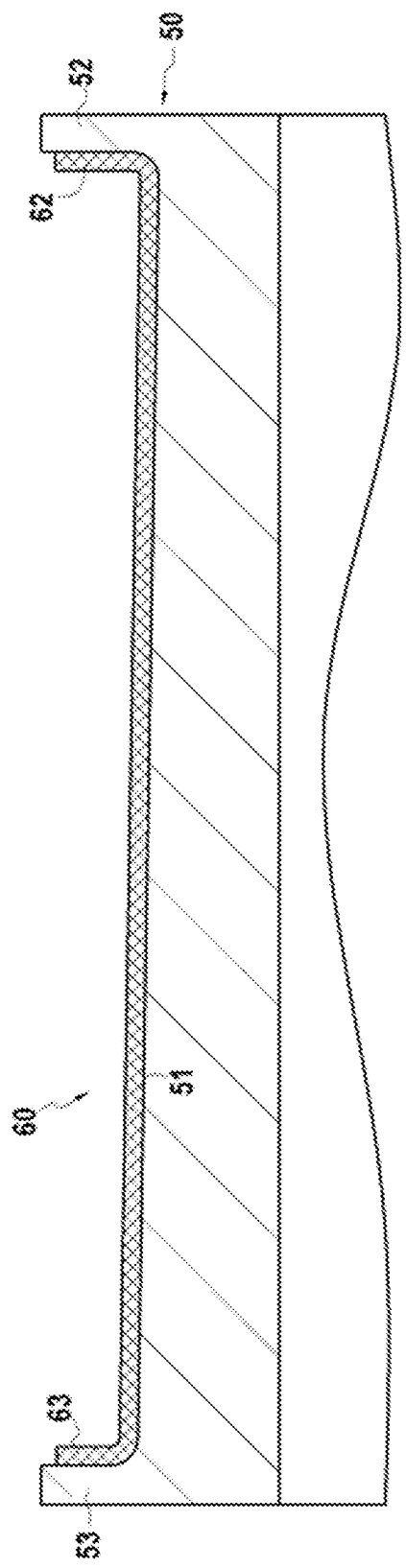
[Fig. 5]

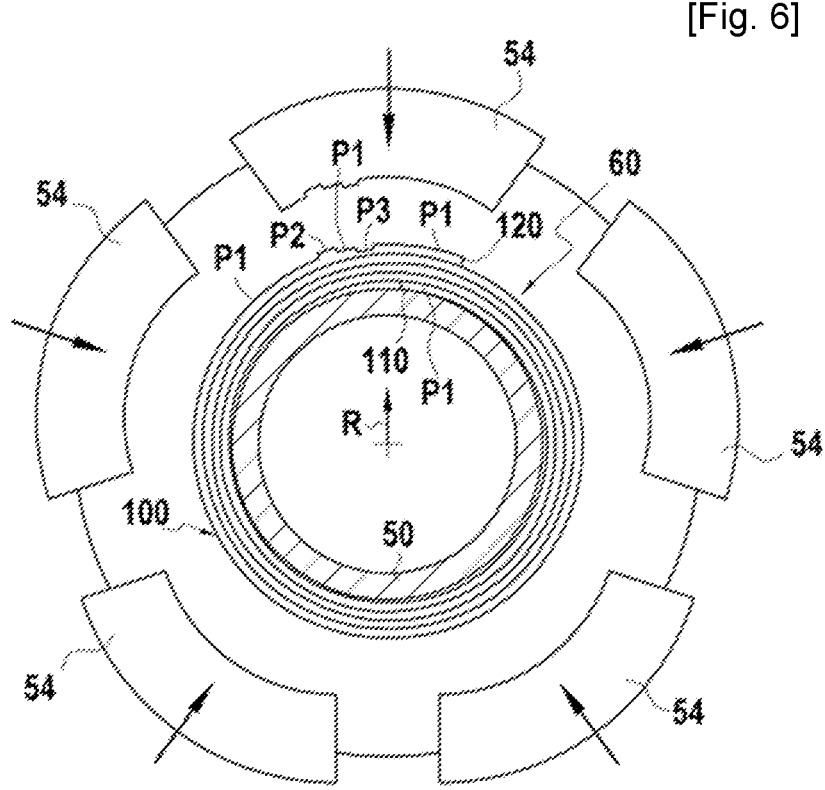
[Fig. 6]

[Fig. 7]
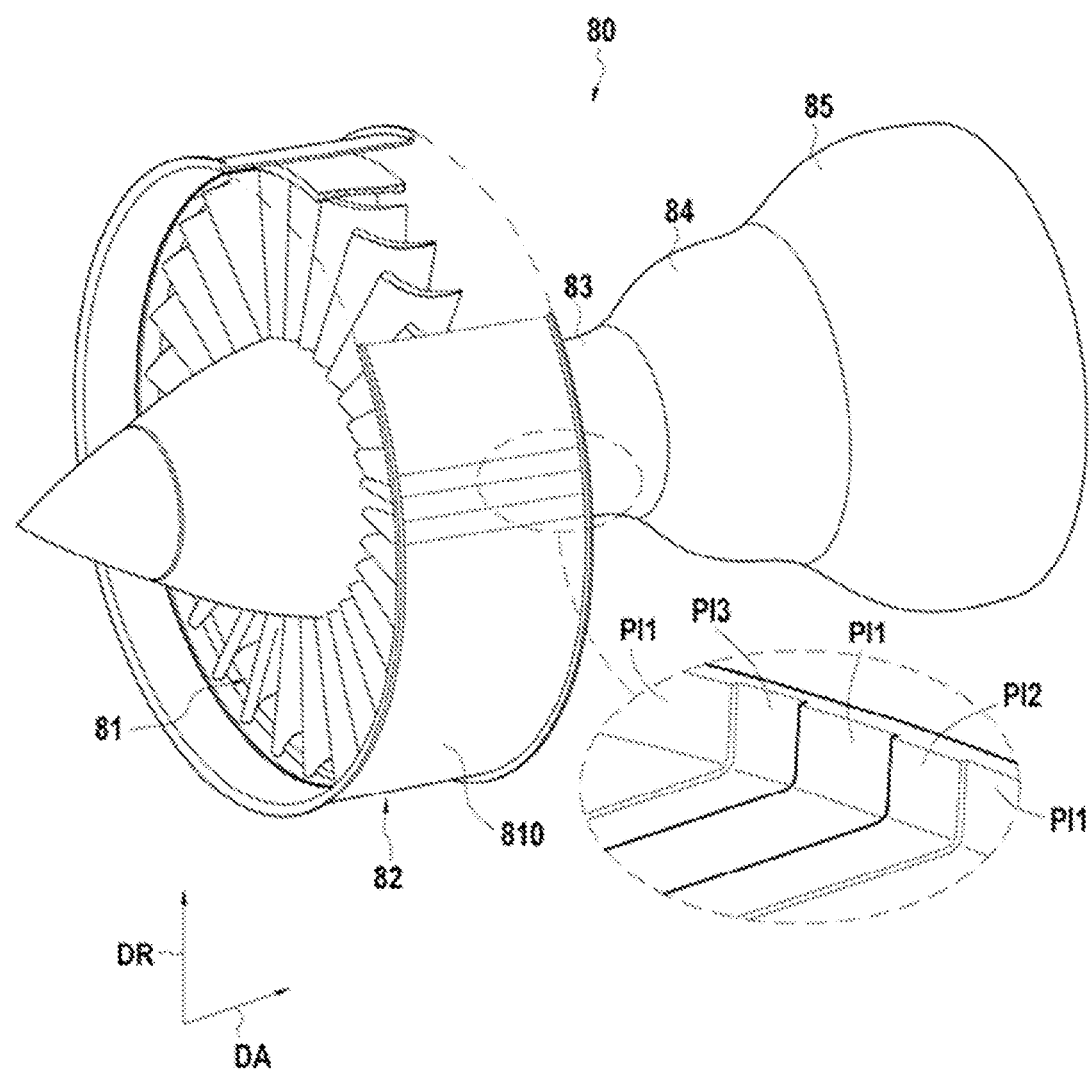

CASING MADE OF COMPOSITE MATERIAL WITH LOCAL VARIATION OF THICKNESS

CROSS-REFERENCE TO RELATED APPLICATIONS

This application is the U.S. National Stage of PCT/FR2020/050068, filed Jan. 17, 2020, which in turn claims priority to French patent application number 1900875 filed Jan. 30, 2019. The content of these applications are incorporated herein by reference in their entireties.

TECHNICAL FIELD

The invention relates to gas turbine casings, and more particularly, but not exclusively, to gas turbine fan casings for aeronautical engines.

PRIOR ART

The manufacture of a casing made of composite material begins with the production of a strip-shaped fibrous texture, the fibrous texture being produced by three-dimensional weaving between a plurality of layers of warp yarns and a plurality of layers of weft yarns. The thus obtained fibrous texture is wound over several turns on a mold or tool having the shape of the casing to be produced and held between the mold and segments forming a counter-mold so as to obtain a fibrous preform.

Once the fibrous preform has been produced, that is to say at the end of the winding of the fibrous texture, the tool carrying the fibrous preform is closed by counter-molds and then transported to an oven or furnace in which the densification of the preform by a matrix is performed, the matrix being able to be in particular obtained by injection and polymerization of a resin in the fibrous preform. The manufacture of a fan casing made of organic-matrix composite material is in particular described in document U.S. Pat. No. 8,322,971.

In an aeronautical gas turbine engine, the fan casing fulfills several functions, one main function which is to ensure the retention retaining the debris ingested inside the engine, or the blades or blade fragments projected by centrifugation, in order to prevent them from passing through the casing and reaching other portions of the aircraft. The fan casing must also fulfill secondary functions such as in particular:
  ensuring the mechanical continuity (forces and moments) between the air inlet duct and the intermediate casing shroud,
  fixing flowpath panels (upstream and downstream acoustic panels and cartridge of abradable material),
  ensuring the connection of the engine parts to each other, etc.

The thickest areas of the casing correspond to the retention area that must be thicker in order to ensure the retention of a projectile and to the upstream and downstream clamps that are generally thick in order to ensure the interfaces with the other portions of the engine and with many force absorptions. The other areas of the casing can be thinned to lighten the overall mass of the casing.

However, as described in document U.S. Pat. No. 8,322,971, the composite material casing has an axisymmetric shape so that the thickness variations made in the casing are present over the entire circumference of the casing. A machining can be used to form local thickness variations in the casing. However, this solution is not desirable because, during the machining, yarns are cut, which degrades the mechanical properties of the composite material of the casing.

However, there is a need to be able to vary the thickness of a casing locally and not axisymmetrically.

DISCLOSURE OF THE INVENTION

The aim of the invention is to propose a gas turbine casing made of composite material whose thickness and/or geometry vary locally without having to resort to a machining of the composite material.

This aim is achieved in particular by virtue of a method for manufacturing a casing made of composite material for a gas turbine, comprising:
  the production of a fibrous texture by three-dimensional weaving between a plurality of layers of warp yarns or strands extending in a longitudinal direction and a plurality of layers of weft yarns or strands extending in the lateral direction, the fibrous texture having a strip shape extending in the longitudinal direction over a determined length between a proximal portion and a distal portion and in the lateral direction over a determined width between a first lateral edge and a second lateral edge,
  the winding of the fibrous texture over several superimposed turns on a mandrel of a profile corresponding to that of the casing to be manufactured in order to obtain a fibrous preform of a shape corresponding to that of the casing to be manufactured,
  the densification of the fibrous preform by a matrix so as to obtain a casing made of composite material having a shape of revolution,
  characterized in that the fibrous texture includes at least one lateral section of variable thickness in which the weft yarns have a size or a count different from the size or the count of the weft yarns of the plurality of layers of weft yarns present in the remainder of the fibrous texture, said at least one lateral section of variable thickness extending over a determined length along the longitudinal direction and over the entire determined width of the fibrous texture along the lateral direction so as to form in the casing at least one portion with a different thickness from the remainder of the casing along a radial direction.

It is thus possible to locally vary the thickness of the casing in the radial direction, without having to machine the composite material of the casing.

According to one particular characteristic of the method of the invention, the fibrous texture includes at least one lateral section of variable the thickness in which the weft yarns have a size or a count greater than the size or the count of the weft yarns of the plurality of layers of weft yarns present in the remainder of the fibrous texture. A thickened section is thus formed in the casing making it possible in particular to constitute locally on the casing a fixing support area for equipment and/or a mechanical reinforcement area. In this case, the weft yarns present in said at least one lateral section of variable thickness may have a count or a size equal to 36K, while the weft yarns of the plurality of layers of weft yarns present in the remainder of the fibrous texture have a count or a size of 24K.

According to another particular characteristic of the method of the invention, the fibrous texture includes at least one lateral section of variable thickness in which the weft yarns have a size or a count smaller than the size or the count of the weft yarns of the plurality of layers of weft yarns present in the remainder of the fibrous texture. A thinned section is thus formed in the casing making it possible in particular to create locally on the casing a clearance area where the space requirement of the casing is reduced and where it is possible to avoid assembly interferences with pipes, harnesses or any other type of equipment. In this case, the weft yarns present in said at least one lateral section of variable thickness may have a count or a size equal to 12K while the weft yarns of the plurality of layers of weft yarns present in the remainder of the fibrous texture have a count or a size of 24K.

The invention also proposes a gas turbine fan casing made of composite material with a fibrous reinforcement comprising a plurality of superimposed turns of a strip-shaped fibrous texture having a three-dimensional weaving between a plurality of layers of warp yarns and a plurality of layers of weft yarns, said fibrous reinforcement being densified by a matrix, characterized in that the fibrous texture includes at least one lateral section of variable thickness in which the weft yarns have a size or a count different from the size or the count of the weft yarns of the plurality of layers of weft yarns present in the remainder of the fibrous texture, said at least one lateral section of variable thickness extending over the entire determined width of the fibrous texture along an axial direction of the casing.

According to one particular characteristic of the casing of the invention, the fibrous texture includes at least one lateral section of variable thickness in which the weft yarns have a size or a count greater than the size or the count of the weft yarns of the plurality of layers of weft yarns present in the remainder of the fibrous texture. A thickened section is thus formed in the casing making it possible in particular to constitute locally on the casing a fixing support area for equipment and/or a mechanical reinforcement area. In this case, the weft yarns present in said at least one lateral section of variable thickness can have a count or a size equal to 36K while the weft yarns of the plurality of layers of weft yarns present in the remainder of the fibrous texture have a count or a size of 24K.

According to another particular characteristic of the casing according to the invention, the fibrous texture includes at least one lateral section of variable thickness in which the weft yarns have a size or a count smaller than the size or the count of the weft yarns of the plurality of layers of weft yarns present in the remainder of the fibrous texture. A thinned section is thus formed in the casing making it possible in particular to create locally on the casing a clearance area where the space requirement of the casing is reduced and where it is possible to avoid assembly interference with pipes, harnesses or any other type of equipment. In this case, the weft yarns present in said at least one lateral section of variable thickness may have a count or a size equal to 12K while the weft yarns of the plurality of layers of weft yarns present in the remainder of the fibrous texture have a count or a size of 24K.

A further object of the invention is an aeronautical gas turbine engine having a fan casing according to the invention.

BRIEF DESCRIPTION OF THE DRAWINGS

FIG. 1 is a schematic perspective view of a loom showing the three-dimensional weaving of a fibrous texture, FIG. 2 is a schematic perspective view of a fibrous texture in accordance with one embodiment of the invention, FIG. 3 is a longitudinal cross-section taken at a thickened section and a thinned section of the fibrous texture of FIG. 2 and showing a weave plane, FIG. 4 is a schematic perspective view showing the winding of a fibrous texture on a shaping tool, FIG. 5 is an axial sectional half-view of a casing preform obtained by winding of a fibrous texture as shown in FIG. 4, FIG. 6 is a sectional view showing the positioning of injection sectors on the preform of the casing of FIG. 5, FIG. 7 is a perspective view of an aeronautical engine in accordance with one embodiment of the invention.

DESCRIPTION OF THE EMBODIMENTS

The invention generally applies to any gas turbine casing made of organic-matrix composite material.

The invention will be described below within the scope of its application to a fan casing of an aeronautical gas turbine engine.

The method for manufacturing a casing made of composite material according to the invention begins, as represented in FIG. 1, with the production of a fibrous texture 100 by weaving using a Jacquard loom 5 on which a bundle of warp yarns or strands 20 has been disposed into a plurality of layers, the warp yarns being interlinked by weft yarns or strands 30.

The fibrous texture is produced by three-dimensional weaving. By "three-dimensional weaving" or "3D weaving" is meant here a mode of weaving by which at least some of the weft yarns interlink warp yarns on several layers of warp yarns or vice versa. The fibrous texture may present an interlock weave. By "interlock" weave is meant here a weave in which each layer of weft yarns interlinks a plurality of layers of warp yarns, with all the yarns in the same weft column having the same movement in the weave plane. Other weaves can be envisaged. The yarns used can be in particular yarns of carbon, glass or silicon carbide fibers.

As illustrated in FIG. 2, the fibrous texture 100 has the shape of a strip which extends lengthwise in a longitudinal direction X corresponding to the direction of travel of the warp yarns or strands 20 and widthwise or transversely in a lateral direction Y between a first and a second lateral edge 101 and 102, the lateral direction Y corresponding to the direction of the weft yarns or strands 30. The fibrous texture extends longitudinally over a determined length $L_{100}$ in the direction X between a proximal portion 110 intended to form the start of the winding of a fibrous preform on a shaping tool and a distal portion 120 intended to form the end of the winding of the fibrous preform.

The fibrous texture further presents a central area 130 extending over a determined width $I_{130}$ in the direction Y, the central area 130 being intended to form the shank or the shroud of the casing. The central area 130 is intended to be present opposite the blades and defines the retention area of the casing to be obtained. The central area 130 is set back from the first 101 and second 102 lateral edges and extends over a determined width $I_{130}$ smaller than the width $I_{100}$ of the texture 100. The central area 130 is at an intermediate position between the first and second lateral edges 101 and 102. The central area 130 is delimited between two lateral areas 140 and 150 each extending over a determined width, respectively $I_{140}$ and $I_{150}$, in the direction Y. The first lateral area 140 extends between the first lateral edge 101 and the central area 130. The second lateral area 150 extends between the second lateral edge 102 and the central area 130. Each of the lateral areas 140 and 150 is intended at least in part to form an annular damp of the casing.

The length $L_{100}$ of the fibrous texture 100 is determined based on the circumference of the tool or the shaping mold so as to allow performing a determined number of turns of the fibrous texture, for example four turns.

In accordance with the invention, the fibrous texture includes one or more lateral sections of variable thickness in which the weft yarns have a size or a count different from the size or the count of the weft yarns of the plurality of layers of weft yarns present in the remainder of the fibrous texture. The lateral section(s) of variable thickness extend over a determined length along the longitudinal direction X and over the entire width of the fibrous texture along the lateral direction Y. In the example described here, the fibrous texture 100 comprises a first lateral section of variable thickness corresponding to a thickened section P2 and a second lateral section of variable thickness corresponding to a thinned section P3. The remainder of the fibrous texture consists of sections P1 of constant lateral thickness. The thickened section P2 and the thinned section P3 extend respectively over determined lengths $L_{P2}$ and $L_{P3}$ along the longitudinal direction X based on the size of the axial portions of thickness variations desired to be formed on the final casing.

In the example described here, the fibrous texture 100 extends over a length $L_{100}$ allowing performing four winding turns on the tool or the shaping mold. Still in the example described here, the first of the sections P1 extends over a length $L_{P1}$ defined so as to correspond to the first three winding turns on the tool or the shaping mold (FIG. 6) while the thickened P2 and thinned P3 sections are present on the fibrous texture at positions corresponding to the last winding turn on the tool or the shaping mold (FIG. 6).

FIG. 3 illustrates an interlock weave plane of the fibrous texture 100 located at the thickened P2 and thinned P3 sections.

The example of weave plane illustrated in FIG. 3 comprises 9 weft layers Tc and 8 warp layers Cc1 to Cc8. In the illustrated interlock weave, a weft layer is formed of two adjacent weft half-layers offset from each other in the weft direction. There is therefore 18 weft half-layers positioned in a staggered manner. Each warp layer interlocks 3 weft half-layers. It would also be possible to adopt a non-staggered disposition, the warp yarns of two neighboring warp layers being aligned on the same columns. Usable interlock weaves are described in document WO 2006/136755.

In the illustrated example, the fibrous texture comprises warp yarns or strands made of carbon fibers, denoted Cc1 to Cc8. The fibrous texture also comprises weft yarns or strands made of carbon fibers, denoted Tc1, Tc2 and Tc3 having a different size or count. The count of a yarn corresponds to its thickness (depending on the type of material of the yarn, the density varies, so the volume occupied for the same mass will be different) and can be defined in several ways. It can be in particular defined by the linear mass of the yarn (mass per unit length) which is generally expressed in tex corresponding to the mass in grams of 1,000 meters of yarn or in decitex (dtx) corresponding to the mass (in grams) of 10,000 meters of yarn. The count of a yarn can also be defined by the number of filaments that compose it. In this case, the count of the yarn is expressed in "K" which corresponds to the number in thousand of filaments per yarn. For example, a 1K yarn comprises 1,000 filaments.

As illustrated in FIG. 3, the first sections P1 include weft yarns Tc1 having a first size or a first count, for example a count of 24K (24,000 filaments), defining a first lateral thickness $E_{P1}$ (FIG. 2) corresponding to the normal thickness of the fibrous texture 100. The thickened section P2 includes weft yarns Tc2 having a second size or a second count greater than the size or the count of the weft yarns Tc1, for example a count of 36K (36,000 filaments), defining in the texture a second lateral thickness $E_{P2}$ (FIG. 2) corresponding to the thickness of the thickened section P2. The thinned section P3 includes weft yarns Tc3 having a third size or a third count smaller than the size or the count of the weft yarns Tc1, for example a count of 12K (12,000 filaments), defining in the texture a third lateral thickness $E_{P3}$ (FIG. 2) corresponding to the thickness of the thinned section P3.

One example has just been described in which the fibrous texture has an interlock weave with 9 weft layers and 8 warp layers. However, there is no departure from the scope of the invention when the number of weft and warp layers is different, or when the fibrous texture has a weave different from an interlock weave.

As illustrated in FIG. 4, a fibrous casing reinforcement is formed by winding on a mandrel 50 of the fibrous texture 100 described above, the fibrous reinforcement constituting a complete tubular fibrous preform of a casing forming a single piece. To this end, the mandrel 50 presents an outer surface 51 whose profile corresponds to the inner surface of the casing to be produced. The mandrel 50 also includes two flanges 52 and 53 to form portions of fibrous preform 62 and 63 corresponding to the clamps of the casing (the clamps 62 and 63 are visible in FIG. 5). The thickened P2 and thinned P3 sections are present at positions on the fibrous texture 100 corresponding to the last turn located radially outwardly of the preform.

FIG. 5 shows a sectional view of the fibrous preform 60 obtained after winding of the fibrous texture 100 in several layers on the mandrel 50. The number of layers or coils depends on the desired thickness and on the thickness of the fibrous texture. It is preferably at least equal to 2. In the example described here, the preform 60 comprises 4 layers of fibrous texture 100.

The densification of the fibrous preform 60 by a matrix is then performed.

The densification of the fibrous preform consists in filling the porosity of the preform, in all or part of the volume thereof, with the material constituting the matrix.

The matrix can be obtained in a manner known per se by the liquid process. The liquid process consists in impregnating the preform with a liquid composition containing an organic precursor of the material of the matrix. The organic precursor is usually in the form of a polymer, such as a resin, optionally diluted in a solvent. The fibrous preform is placed in a mold that can be sealingly closed with a housing having the shape of the final molded part. As illustrated in FIG. 6, the fibrous preform 60 is here placed between a plurality of sectors 54 forming a counter-mold and the mandrel 50 forming a support, these elements respectively having the external shape and the internal shape of the casing to be produced. Then, the liquid matrix precursor, for example a resin, is injected into the entire housing to impregnate the preform.

The transformation of the precursor into an organic matrix, namely its polymerization, is performed by thermal treatment, generally by heating of the mold, after removal of the potential solvent and crosslinking of the polymer, the preform always being held in the mold having a shape corresponding to that of the part to be produced. The organic matrix can be in particular obtained from epoxy resins, such as, for example, the high-performance epoxy resin sold, or from liquid carbon or ceramic matrix precursors.

In the case of the formation of a carbon or ceramic matrix, the thermal treatment consists in pyrolyzing the organic precursor to transform the organic matrix into a carbon or ceramic matrix according to the precursor used and the pyrolysis conditions. For example, liquid carbon precursors can be resins with relatively high coke content, such as phenolic resins, while liquid ceramic precursors, in particular SiC precursors, can be polycarbosilane (PCS) or polytitanocarbosilane (PTCS) or polysilazane (PSZ) type resins. Several consecutive cycles, from the impregnation to the thermal treatment, can be carried out to achieve the desired degree of densification.

The densification of the fibrous preform can be performed by the well-known Resin Transfer Molding (called RTM) process. In accordance with the RTM process, the fibrous preform is placed in a mold having the shape of the casing to be produced. A thermosetting resin is injected into the internal space delimited between the part made of rigid material and the mold and which comprises the fibrous preform. A pressure gradient is generally established in this internal space between the place where the resin is injected and the discharge orifices of the latter in order to control and optimize the impregnation of the preform with the resin.

The resin used can be, for example, an epoxy resin. Resins adapted for the RTM processes are well known. They preferably have a low viscosity to facilitate their injection into the fibers. The choice of the temperature class and/or the chemical nature of the resin is determined based on the thermomechanical stresses to which the part must be subjected. Once the resin has been injected into all the reinforcement, it is polymerized by thermal treatment in accordance with the RTM process.

After injection and polymerization, the part is demolded. The part is finally trimmed to remove the excess resin and the chamfers are machined to obtain a casing 810 having a shape of revolution as illustrated in FIG. 7.

The casing 810 represented in FIG. 7 is a casing of an aeronautical gas turbine engine fan 80. Such an engine, as shown very schematically by FIG. 7 comprises, from upstream to downstream in the direction of flow of the gas stream, a fan 81 disposed at the inlet of the engine, a compressor 82, a combustion chamber 83, a high-pressure turbine 84 and a low-pressure turbine 85. The engine is housed inside a casing comprising several portions corresponding to different elements of the engine. Thus, the fan 81 is surrounded by the casing 810.

In addition, the casing 810 has a thickened section P12 corresponding to the thickened section P2 produced in the fibrous texture, the thickened section P12 extending over the entire width of the casing along an axial direction DA of the casing 810 and in thickness along a radial direction DR of the casing 810. The casing 810 also has a thinned section P13 corresponding to the thinned section P3 produced in the fibrous texture, the thinned section P13 extending over the entire width of the casing along an axial direction DA of the casing 810 and in thickness along a radial direction DR of the casing 810.

The thickened section P12 allows, for example, constituting locally on the casing a fixing support area for equipment and/or a mechanical reinforcement area. The thinned section P13 allows, for example, creating a clearance area where the space requirement of the casing is reduced and where it is possible to avoid assembly interference with pipes, harnesses or any other type of equipment.

In the example described here, the fibrous texture used to form the fibrous reinforcement of the composite material casing comprises two lateral sections with variable thickness present at positions corresponding to the last winding turn of the fibrous preform. However, the fibrous texture may comprise a different number of lateral sections with variable thickness corresponding either to thickened or thinned sections, and this at different positions on the fibrous structure. The fibrous structure may, for example, include several thickened or thinned sections distributed over the fibrous texture at overlapping positions during the winding of the texture to form the fibrous casing preform so as to accentuate the thickened section or the resulting thinned section in the final casing.

The invention claimed is:

1. A method for manufacturing a casing made of composite material for a gas turbine, comprising:
producing a fibrous texture by three-dimensional weaving between a plurality of layers of warp yarns or strands extending in a longitudinal direction and a plurality of layers of weft yarns or strands extending in the lateral direction, the fibrous texture having a strip shape extending in the longitudinal direction over a determined length between a proximal portion and a distal portion and in the lateral direction over a determined width between a first lateral edge and a second lateral edge,
winding the fibrous texture over several superimposed turns on a mandrel of a profile corresponding to that of the casing to be manufactured in order to obtain a fibrous preform of a shape corresponding to that of the casing to be manufactured,
densifying the fibrous preform by a matrix so as to obtain a casing made of composite material having a shape of revolution,
wherein the fibrous texture includes at least one lateral section of variable thickness in which the weft yarns have a size or a count different from the size or the count of the weft yarns of the plurality of layers of weft yarns present in the remainder of the fibrous texture, said at least one lateral section of variable thickness extending over a determined length along the longitudinal direction and over the entire determined width of the fibrous texture along the lateral direction so as to form in the casing at least one portion with a different thickness from the remainder of the casing along a radial direction.

2. The method according to claim 1, wherein the fibrous texture includes at least one lateral section of variable thickness in which the weft yarns have a size or a count greater than the size or the count of the weft yarns of the plurality of layers of weft yarns present in a remainder of the fibrous texture.

3. The method according to claim 2, wherein the weft yarns present in said at least one lateral section of variable thickness have a count or a size equal to 36K while the weft yarns of the plurality of layers of weft yarns present in the remainder of the fibrous texture have a count or a size of 24K.

4. The method according to claim 1, wherein the fibrous texture includes at least one lateral section of variable thickness in which the weft yarns have a size or a count smaller than the size or the count of the weft yarns of the plurality of layers of weft yarns present in the remainder of the fibrous texture.

5. The method according to claim 4, wherein the weft yarns present in said at least one lateral section of variable thickness have a count or a size equal to 12K while the weft yarns of the plurality of layers of weft yarns present in the remainder of the fibrous texture have a count or a size of 24K.

6. A gas turbine fan casing made of composite material with a fibrous reinforcement comprising a plurality of superimposed turns of a strip-shaped fibrous texture having a three-dimensional weaving between a plurality of layers of warp yarns and a plurality of layers of weft yarns, said fibrous reinforcement being densified by a matrix,
   wherein the fibrous texture includes at least one lateral section of variable thickness in which the weft yarns have a size or a count different from the size or the count of the weft yarns of the plurality of layers of weft yarns present in the remainder of the fibrous texture, said at least one lateral section of variable thickness extending over the entire width of the fibrous texture along an axial direction of the casing.

7. The casing according to claim 6, wherein the fibrous texture includes at least one lateral section of variable thickness in which the weft yarns have a size or a count greater than the size or the count of the weft yarns of the plurality of layers of weft yarns present in the remainder of the fibrous texture.

8. The casing according to claim 7, wherein the weft yarns present in said at least one lateral section of variable thickness have a count or a size equal to 36K while the weft yarns of the plurality of layers of weft yarns present in the remainder of the fibrous texture have a count or a size of 24K.

9. The casing according to claim 6, wherein the fibrous texture includes at least one lateral section of variable thickness in which the weft yarns have a size or a count smaller than the size or the count of the weft yarns of the plurality of layers of weft yarns present in the remainder of the fibrous texture.

10. The casing according to claim 9, wherein the weft yarns present in said at least one lateral section of variable thickness have a count or a size equal to 12K while the weft yarns of the plurality of layers of weft yarns present in the remainder of the fibrous texture have a count or a size of 24K.

11. An aeronautical gas turbine engine having a fan casing according to claim 6.

\* \* \* \* \*

UNITED STATES PATENT AND TRADEMARK OFFICE
CERTIFICATE OF CORRECTION

PATENT NO.       : 11,702,961 B2
APPLICATION NO.  : 17/426901
DATED            : July 18, 2023
INVENTOR(S)      : Clément Bourolleau et al.

It is certified that error appears in the above-identified patent and that said Letters Patent is hereby corrected as shown below:

On the Title Page

Column 1, In Item (86) PCT No. should read:
PCT/FR2020/050068

Signed and Sealed this
Fifteenth Day of August, 2023

Katherine Kelly Vidal
*Director of the United States Patent and Trademark Office*